United States Patent

Wisniewski

[11] Patent Number: 5,190,644
[45] Date of Patent: Mar. 2, 1993

[54] MOTION CONTROLLER FOR WASTEWATER TREATMENT TRICKLING FILTER

[75] Inventor: Robert S. Wisniewski, Walker, Mich.

[73] Assignee: City of Wyoming, Wyoming, Mich.

[21] Appl. No.: 843,531

[22] Filed: Feb. 28, 1992

[51] Int. Cl.$^5$ .............................................. C02F 3/04
[52] U.S. Cl. ........................................ 210/97; 210/145; 210/150; 210/541; 239/254
[58] Field of Search ................. 188/290, 292; 210/150, 210/151, 107, 97, 143, 145, 530, 541; 239/254, 256

[56] References Cited

U.S. PATENT DOCUMENTS

| | | | |
|---|---|---|---|
| 904,324 | 11/1908 | Hartley | 239/254 |
| 1,516,429 | 11/1924 | Hartley et al. | 239/254 |
| 2,106,493 | 1/1938 | Byers | 188/292 |
| 2,207,136 | 7/1940 | Veatch | 210/150 |
| 2,223,257 | 11/1940 | Mallory | 210/530 |
| 2,223,258 | 11/1940 | Mallory | 210/530 |
| 2,763,974 | 9/1956 | Martin | 188/292 |
| 2,888,144 | 5/1959 | Aldrich | 210/530 |
| 3,103,260 | 9/1963 | Gaines et al. | 188/290 |
| 3,215,274 | 11/1965 | Schreiber | 210/150 |
| 3,265,358 | 8/1966 | Delaney | 188/290 |
| 3,519,248 | 7/1970 | Kushiro | 188/272 |
| 4,392,663 | 7/1983 | Forslund | 188/293 |
| 4,623,048 | 11/1986 | Rusk | 188/272 |
| 4,811,942 | 3/1989 | Rusk | 188/293 |
| 5,096,588 | 3/1992 | Albertson | 210/150 |

FOREIGN PATENT DOCUMENTS 1074993  7/1982  United Kingdom.

Primary Examiner—Stanley S. Silverman
Assistant Examiner—Christopher Upton
Attorney, Agent, or Firm—Price, Heneveld, Cooper, DeWitt & Litton

[57] ABSTRACT

An apparatus for controlling the rate of rotation of a wastewater distribution assembly for a sewage treatment trickling filter contained by a vessel. The wastewater distribution assembly is of the type including a support and at least one distribution arm having an end terminating adjacent a wall of the vessel. The apparatus comprises a carriage having at least one wheel rotatably mounted to the end of the distribution arm and adapted to engage the vessel and means mounted to the carriage for controlling the rotation rate or free-wheeling of the wheel.

19 Claims, 3 Drawing Sheets

MOTION CONTROLLER FOR WASTEWATER TREATMENT TRICKLING FILTER

BACKGROUND OF THE INVENTION

The present invention relates to a device to improve wastewater treatment and particularly the conversion of dissolved solids to suspended solids so they may be removed from the wastewater.

Generally each house or business has a pipe or sewer which connects to a network of larger sewers carrying wastewater to a wastewater treatment plant. The wastewater from a sewer system either flows by gravity or is pumped into the treatment plant. Usually, treatment consists of two major steps, primary and secondary, along with a process to dispose of solids removed during the two steps.

In primary treatment, the objective is to physically remove suspended solids from the wastewater either by screening, settling or floating. Screening removes large floating objects from the incoming wastewater stream. Treatment plant screens are sturdily built to withstand the flow of untreated wastewater for years at a time. Rags, wood, plastics and other floating objects can clog pipes and disable treatment plant pumps if not removed at this point. Sand, grit and gravel flow through the screens to be picked up in the next stage of primary treatment—the grit chamber. Grit chambers are large tanks designed to slow the wastewater down just long enough for the grit to drop to the bottom. Grit is usually washed after its removal from the chamber and buried in a landfill.

After the flow passes out of the grit chamber, it enters a more sophisticated settling basin called a sedimentation tank. Sedimentation removes the solids that are too light to fall out in the grit chamber. The sedimentation tanks are designed to hold wastewater for several hours. During that time, the suspended solids drift to the bottom of the tank where they can be pushed into a large mass by mechanical scraper and removed from the bottom of the tank. The solids removed at this point are called primary sludge. The primary sludge is usually pumped through a sludge digester for further treatment.

During the sedimentation process, floatable substances, such as grease and oil, rise to the surface and are removed by a surface skimming system. The skimmed materials are either sent to the sludge digester for treatment along with the primary sludge, or are incinerated. Sedimentation marks the end of primary treatment. At this point, most of the solids in the stream that can be removed by the purely physical processes of screening, skimming and settling have been collected. An additional set of techniques using biological processes are employed in secondary treatment.

The major goal of secondary treatment is to biologically remove contaminants that are dissolved in the wastewater. In a natural stream such contaminants are a source of food for protozoa, fungi, algae and hundreds of varieties of bacteria. The secondary treatment stage is a highly controlled artificial environment in which the same microscopic organisms are allowed to work as fast and as efficiently as they can. Air is supplied to encourage the natural growth processes of bacteria and other biological organisms to consume most of the waste. The microorganisms biologically convert the dissolved solids in the wastewater to suspended solids which will physically settle out at the end of secondary treatment. These organisms, and other solids, are then separated from the wastewater.

Secondary treatment promotes the growth of millions of microorganisms, bringing them into close contact with the wastewater in which they feed. It is critical to make sure that the temperature, oxygen level, and contact time support rapid and complete consumption of the dissolved wastes. The final products are carbon dioxide, water, and more organisms. Three common types of secondary treatment include trickling filters, activated sludge, and lagoons.

Trickling filters are large beds of coarse, loosely packed material, such as rocks, wooded slats, or shaped plastic pieces, over which the wastewater is sprayed or spread. The surfaces of the filter material ("medium") become breeding grounds for the microorganisms that consume the wastes. A common trickling filter is a bed of stones three to ten feet deep. Under the bed a system of drains collect the treated wastewater and divert it to a sedimentation tank, or back over the filter medium for additional cleansing. In the sedimentation tank, suspended solids settle and are pumped to the sludge digester. Trickling filters are relatively simple to construct and operate.

The dimensions of a trickling filter depend largely upon capacity. In general, the medium of the trickling filter is constrained by a cylindrical concrete or metallic vessel which may or may not be recessed within the earth. Concentric with the vessel is a rotating distribution head having a plurality of distribution arms radiating therefrom, each substantially parallel to the upper surface of the filter medium. Each arm has a plurality of outlet openings or jets adapted to distribute the wastewater over the filter medium. The rotary action of the distributor is induced by reaction from the jets oriented in the same direction. The rate of rotation of the distributor generally increases with an increase in the amount of wastewater distributed. A variable rotation rate of the distributor results in periods of increased build-up of bacterial growth along the upper portion of the filter medium, impeding the filtering process. It is believed that the increased build-up of bacterial growth in the top portion of the filter occurs at the expense of bacterial breakdown further down, thus resulting in an overall decrease in efficiency.

In one instance the rotation rate of wastewater trickling filters has been controlled by the angular orientation of the jets. To increase rotation rate, the distribution arms are rotated about the axis of each arm so that all the jets are oriented in the same direction. The distributor may be slowed by orienting some outlets in the opposite direction or angled slightly with respect to the rest. Passive techniques include air brakes or other wind resistance devices to slow rotation. Active mechanisms include the use of belt or chain drives interconnecting a sheave or gear on the central distribution head to a fixed brake or electric dynamo.

In other attempts, positive drive mechanisms have been placed at the ends of the distribution arms to rotate the trickling filter. Previous devices include electrically driven carriages riding on a monorail located about the perimeter of the filter vessel. Earlier drive mechanisms were powered by gears engaging the perimeter of the vessel and driven by paddlewheels located in the wastewater line.

The disadvantage associated with water propelled tricking filters is that rotation rate increases with increased flow. The net affect is that the flow rate per unit area of medium is not substantially changed, resulting in foaming and increased bacterial growth in the uppermost reaches of the medium. Efficiency of the filter is not improved. Positive drive mechanisms require a power source independent of wastewater flow such as electricity. This results in more complex and expensive mechanisms to operate.

The present invention was devised as a solution for these and other problems by providing a device to control the maximum rotation rate of the distribution arms thereby improving the hydraulic action of the wastewater over the filter medium to promote bacterial growth and removal of dissolved solids. Moreover, the present invention is not affected by wastewater discharge and provides an inexpensive and reliable independent control.

SUMMARY OF THE INVENTION

Accordingly, the present invention provides a device for improving the biological treatment of wastewater.

In one form, the invention includes an apparatus for controlling the rate of rotation of a wastewater distribution assembly for a sewage treatment trickling filter contained by a vessel. The wastewater distribution assembly is of the type including a support and at least one distribution arm having an end terminating adjacent a wall of the vessel. The apparatus comprises a carriage having at least one wheel rotatably mounted to the end of the distribution arm and adapted to engage the vessel. The apparatus further includes means mounted to the carriage for controlling the rotation rate of the wheel.

In another form, the invention includes a carriage mounted to an end of at least one distribution arm. The carriage has a wheel mounted thereon for engaging the vessel wall.

Preferably, the wheel is mechanically coupled to a hydraulic pump through a belt or chain, which forces hydraulic fluid through a restricted orifice. The pump and orifice create a hydraulic back pressure which is fed back to the wheel, which in turn controls the rotation rate of the distribution arm.

In a preferred form of the invention, the carriage is pivotally coupled to the end of the distribution arm allowing the carriage to absorb any irregularities between the vessel wall and the end of the arm. Shafts of the wheel and hydraulic pump are mechanically interconnected via sheaves and a V-belt. The diameter ratios of wheel sheave to pump sheave is such so as to achieve maximum pump revolutions for every revolution of the wheel.

As will be understood from the invention, numerous advantages over the prior known trickling filter enhancing devices are provided by this invention. These include cost savings associated with operation, maintenance and manufacturing of the sewage distributor rate controller. The controller allows significantly better hydraulic action of the wastewater over the filter medium. This, in turn, reduces the odor associated with wastewater treatment, reduces the biological demand for oxygen, and improves efficiency of the filter. A further advantage provided by the instant invention is the ease of mounting the controller to existing trickling filters. This provides an easy and inexpensive way to upgrade older trickling filter distribution assemblies and improve the efficiency of biologic cleaning of wastewater.

A still further advantage of the invention is its serviceability and ease in accessing all the components.

The fact that the controller is disposed at an end of the distribution arm provides ample room for maintenance.

These and other objects, advantages, purposes and features of the invention will become apparent from a study of the following detailed description taken in conjunction with the appended drawing figures.

DETAILED DESCRIPTION OF THE PREFERRED EMBODIMENTS

Figure 1:
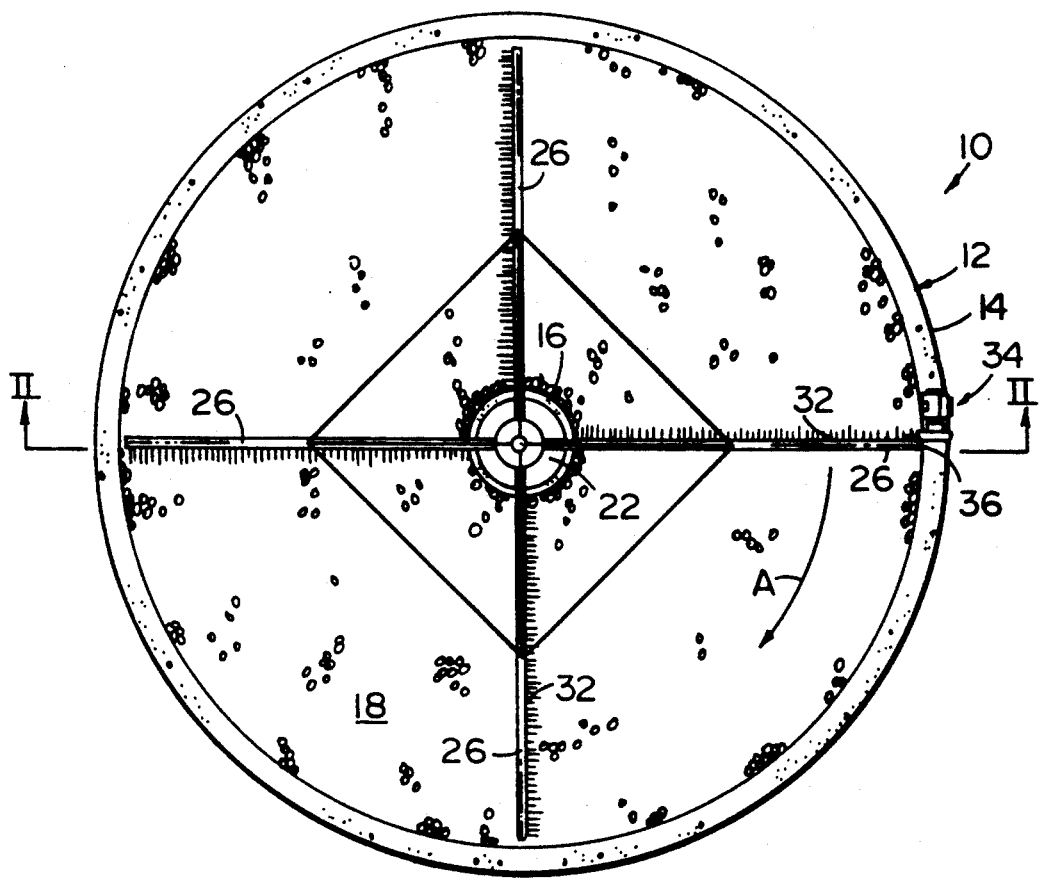
FIG. 1 is a plan view of a tricking filter for use on a water treatment plant.
Figure 2:
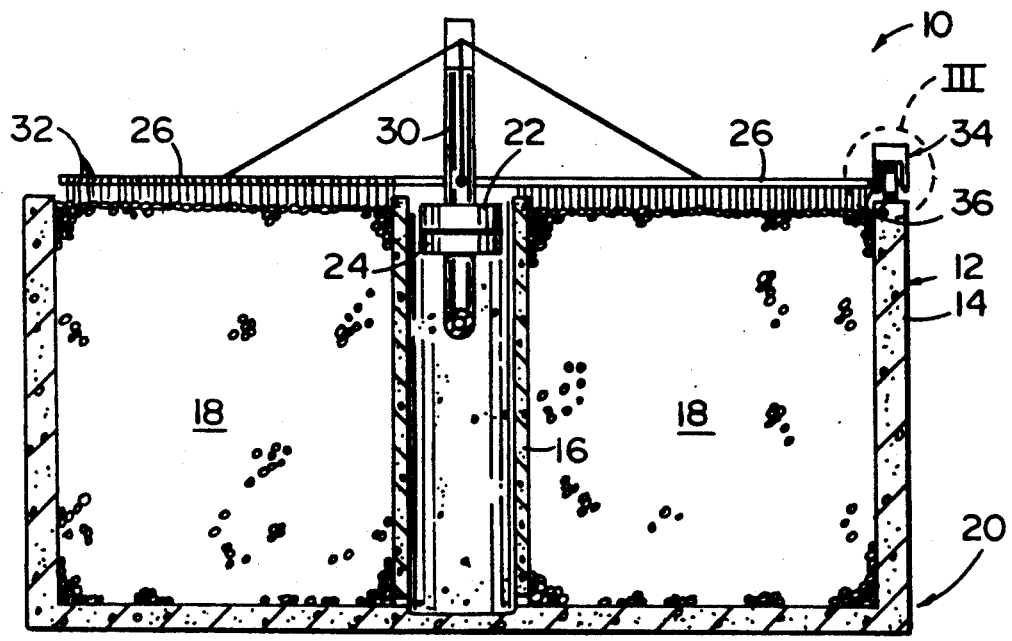
FIG. 2 is an elevation section view of the trickling filter taken along lines II—II in FIG. 1.

Referring now to the drawings in greater detail, FIGS. 1 and 2 illustrate a generic trickling filter 10 used in the secondary treatment of wastewater. Trickling filter 10 is a highly controlled, artificial environment where microscopic organisms are allowed to convert dissolved solids in the wastewater to suspended solids. Trickling filter 10 includes a vessel 12 which may be constructed from metal or concrete. The dimensions of vessel 12 may vary depending upon the desired capacity of wastewater to be treated. It is not uncommon for trickling filters to be circular with diameters greater than 50 feet. Depths will also vary in response to the same requirements, ranging from 3 feet to over 20 feet. Although a circular or cylindrical trickling filter 10 is disclosed, the invention may be used equally as well on rectilinear distribution assemblies or other propelled distribution assembly.

Vessel 12 includes an outer cylindrical wall 14 and an inner concentric wall 16. Inner and outer walls 14, 16 are generally the same thickness and height and are sufficiently strong to retain filter medium 1 disposed therein. Filter medium 18 is typically a large bed of coarse, loosely packed material, such as stones, wooded slats, or shaped plastic pieces, over which the wastewater is sprayed. The surfaces of the filter media become the breeding grounds for the microorganisms that consume the waste. A drainage system and basin 20, underlying filter media 18, collects and diverts the treated wastewater to other parts of the treatment plant.

Centrally disposed at the top of trickling filter 10, concentric with inner wall 16, is a distribution head 22 fixed to a rotatable coupling 24. Distribution head 22 has a plurality of radially extending arms 26, all spaced equidistant from each other. Each distribution arm 26 extends in a substantially horizontal direction away from head 22 and parallel to an upper surface of filter medium 18. Arms 26 extend substantially to outer wall 14, suspended periodically along their length by guide wires 28 attached to central post 30 atop distribution head 22.

Typically, the force rotating head 22 and arms 26 is created by the expulsion of wastewater through nozzles 32 spaced along each arm 26 and oriented in the same direction. As illustrated in FIG. 1, nozzles 32 are contained on the same side of each arm, forcing head 22 to rotate in a clockwise direction represented by arrow A. Prior to this invention, the rotation rate would vary depending upon the discharge rate of wastewater through nozzles 32. The greater the discharge rate, the faster head 22 would spin. Conversely, the lesser the discharge, the slower the rotation rate.

Referring to FIGS. 2 through 6, a motion controller or governor 34 is attached to an outer end 36 of at least one arm 26. In a preferred embodiment, controller 34 includes a carriage or frame 38 having a wheel 40 adapted to engage an upper surface 42 of vessel wall 14. Preferably, wheel 40 includes a metal rim 41 such as the type used by cars and trailers. Metal rim 41 has either a solid rubber or air-filled tire 43 for engaging the surface of vessel 12. A rubber tire 43 is preferred so as to optimize traction between wheel 40 and upper surface 42.

Frame 38 includes a pair of horizontal parallel members 46 spaced from each other. A first end 48 of horizontal members 46 are interconnected to each other by a tubular member 50. The opposite ends of horizontal members 46 are interconnected by shaft 52 of wheel 40. Each end of shaft 52 is retained in place by pillow block bearings 54, one fixed to each horizontal member 46. One end 56 of shaft 52 extends beyond bearing 54 and horizontal member 46 to receive a sheave 58. It is preferred that sheave 58 has a single V-groove 60 adapted to receive a V-belt 62. V-belt 62 may be made taut about both sheaves 58. 86 by an idler arm 63. Idler arm 63 may be mounted along either stretch of V-belt 62 between sheaves 58 and 86 and is preferably mounted to housing 44. Idler arm 63 includes a mounting bracket 65 having one end 67 mounted to housing 44. A second end 69 has a pulley 71 mounted thereto which engages V-belt 62.

Controller 34 includes housing 44 supported above frame 38. A pair of uprights 64 extend from frame 38 proximate, and inboard of, pillow block bearings 54. A cross support 66 extends from horizontal member 46 near tubular member 50, crossing upright 64 and fastened to a bottom edge of housing 44.

It is preferred that frame 38 and housing 44 be constructed from metal. Horizontal members 46 and uprights 64 are preferably two inch angle iron while housing 44 is constructed from sheet metal stock. Similarly, tubular member 50 is steel. All of the couplings or junctions between the various components of the frame are preferably welded, forming a rigid structure. Although metal is a preferred material for constructing frame 38 and housing 44, plastics and other rigid and weather resistant materials may be used which are considered to be within the scope of this invention.

Figure 7:
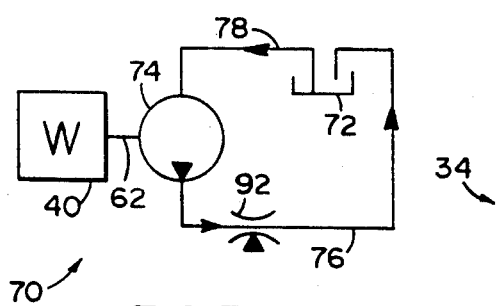
FIG. 7 is a schematic diagram of the hydraulic system in the present invention.
Figure 3:
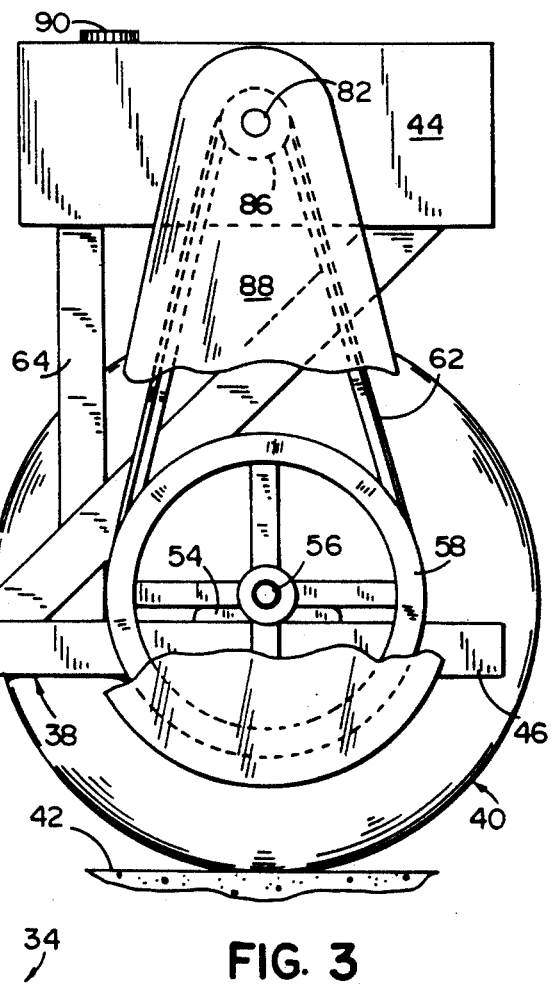
FIG. 3 is a side elevational view of the present invention.
Figure 5:
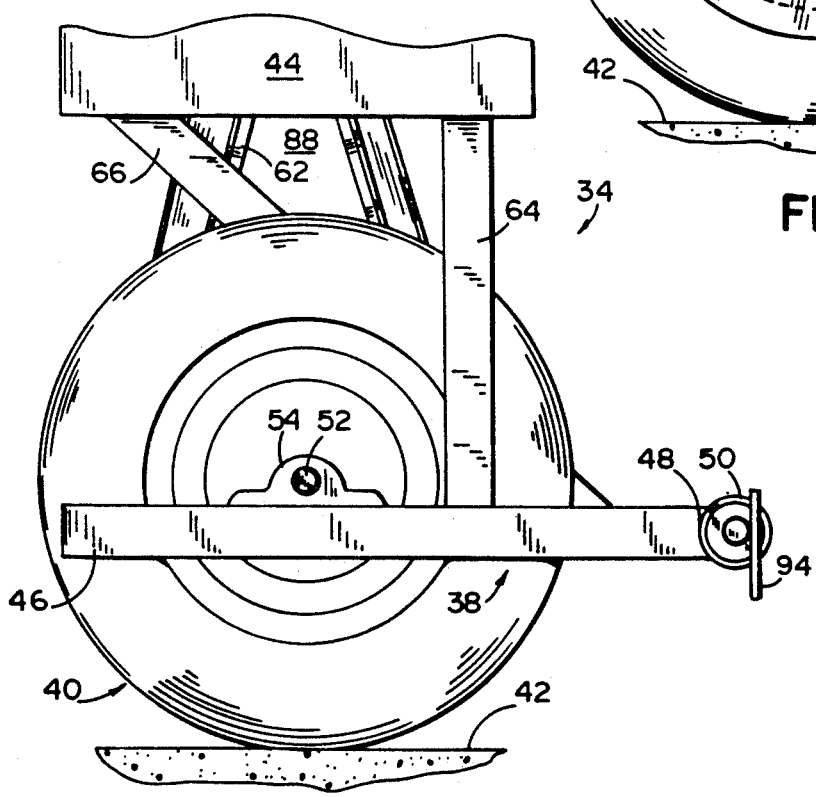
FIG. 5 is a side elevational view from a side opposite to that shown in FIG. 3.
Figure 4:
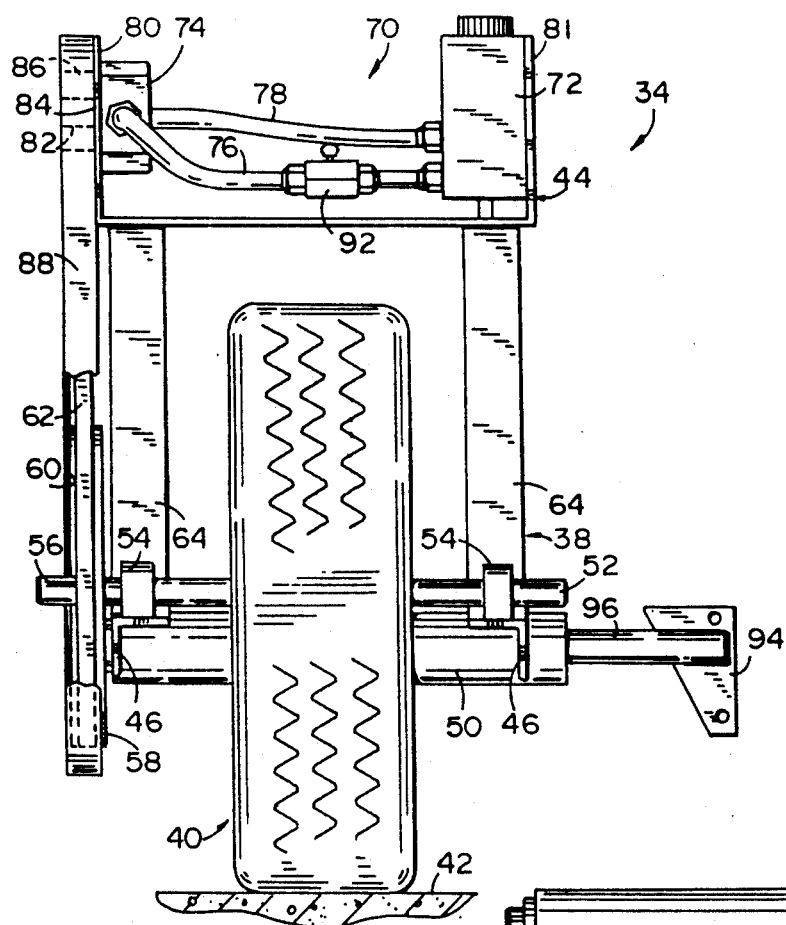
FIG. 4 is a front elevational view of the present invention.
Figure 6:
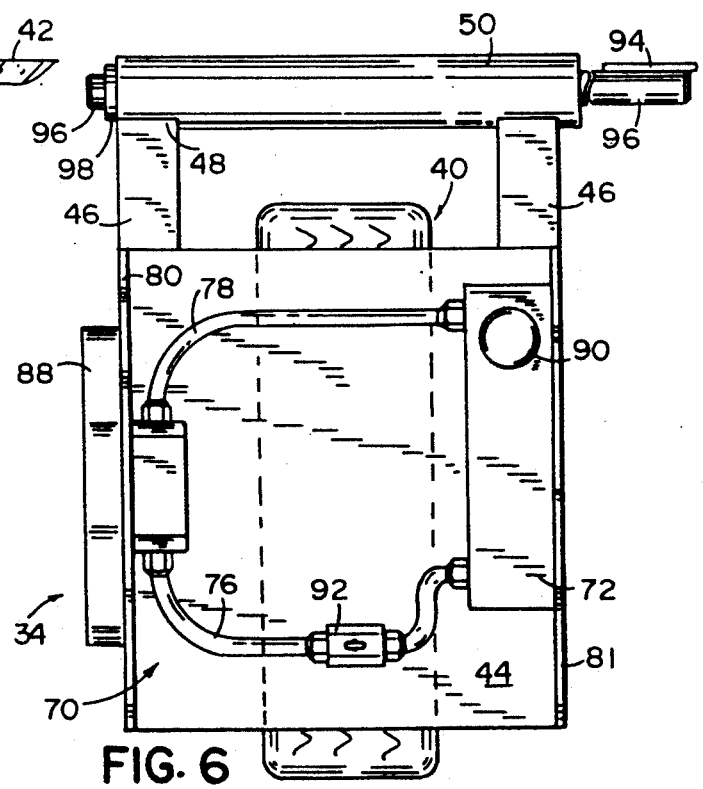
FIG. 6 is a plan view of the present invention taken along line V—V in FIG. 4.

Referring to FIGS. 4, 6 and 7, housing 44 contains a closed hydraulic circuit 70 including a reservoir 72, a pump 74, and a pressure line and suction line 76 and 78, respectively, interconnecting pump 74 and reservoir 72. Pump 74 may be a positive displacement rotary, gear or axial displacement pump, preferably having a displacement of 6.8 gallons per minute (gpm). An example of such a pump is designated as Model No. P-12-45-A4K5, manufactured by Tyrone Hydraulics Division, of Corinth, Miss. Pump 74 may be mounted to a wall 80 of housing 44 so that pump shaft 82 extends through hole 84 in the side of housing 44 and substantially parallel to shaft 56 passing through wheel 40. A sheave 86 is fixed to pump shaft 82 outboard of housing 44 and aligned with sheave 58 below. V-belt 62 is received by the grooves in both sheaves, mechanically coupling wheel 40 to hydraulic pump 74. A belt guard 88 may be mounted by brackets to both frame 38 and housing 44 so as to enclose sheaves 58, 88 and V-belt 62.

Reservoir 72 is mounted to another wall 81 of housing 44, preferably opposite wall 80. Reservoir 72 includes a filler cap 90 on an upper surface and a drain (not shown) along a lower surface. The drain may contain a well-known stop cock which extends through a hole defined in the bottom of the housing.

Reservoir 72 is coupled by hydraulic fittings to high and low pressure lines 76 and 78, respectively. Similar pressure fittings couple lines 76, 78 to the appropriate high and low pressure ports of pump 74. A restriction or needle valve 92 is placed in-series with pressure line 76 to provide a means for metering the amount of hydraulic fluid moved by pump 74. Needle valve 92 is of the adjustable type so as to vary the size of the orifice and amount of hydraulic fluid to be passed therethrough. For example, one such needle valve is designated ENL-258 manufactured by Deltrol of Bellwood, Ill., and having a three-eighths inch fitting at each end.

Governor 34 is coupled to end 36 of arm 26 by a bracket 94 disposed at an end of a shaft 96 adapted to be received in tubular member 50. Shaft 96 is retained with tubular member 50 by a locking collar 98. Locking collar 98 permits rotational movement of shaft 96 but limits axial movement. In this manner, spatial variations between vessel wall 14 and end 36 of arm 26 may be accommodated, allowing shaft 96 to move axially within tubular member 50 for horizontal variations, and pivotal movement for vertical variations.

It is understood that variations occur in the volume of wastewater treated at a wastewater treatment plant according to use. Without controller 34, an increased volume of wastewater through nozzles 32 would result in an increased rate of rotation of distribution head 22 and arms 26. It has been determined that such increase volumes of wastewater sprayed over filter medium 18 decreases the efficiency of filter 10.

Attaching controller 34 as described above to end 36 of at least one distribution arm 26 increases the efficiency of filter 10. Wheel 40, engaging the top surface 42 of vessel wall 14, rotates as distribution head 22 rotates. Rotation or free-wheeling of wheel 40 also rotates shaft 52 and sheave 58, causing V-belt 62 to rotate pump shaft 82. Rotation of pump shaft 82 actuates pump 74, pumping hydraulic fluid from reservoir 72 through adjustable needle valve 92 and back into reservoir 70. Because of the restriction adjustable in needle valve 92, and the greater displacement of pump 74, a pressure build-up occurs in the pressure side of pump 74. The pressure build-up, or back pressure, reduces the ability of pump 74 to work, creating friction between pump 74 and the hydraulic fluid. This back pressure or friction is transmitted back through the pump shaft 82 to V-belt 62, which in turn the freewheeling of wheel 40. Because pump 74 is under friction, wheel 40 is also under friction with the surface of vessel wall 14, thus controlling the rotation rate of distribution head 22. The traction or frictional coupling of tire 43 with surface 42 of wall 14 is enhanced by the weight of controller 34. The metallic structure, sheaves and hydraulic circuit combined are sufficiently heavy to bear down upon wheel 40 and maintain a good contact with wall 14.

The rotation rate of distribution head 22 may be increased by adjusting needle valve 92 to provide a larger orifice in pressure line 76. Fluid pumped through the enlarged restriction creates less friction in pump 74. A reduction in pump friction/back pressure is in turn passed through the mechanical couplings, allowing wheel 40 to rotate more freely. Conversely, a slower rotation rate can be achieved by adjusting needle valve 92 to create a narrower orifice, increasing hydraulic back pressure.

By slowing the rotation rate of the distribution head, the distribution arms spray more wastewater over a unit area, increasing the hydraulic action. The increased hydraulic action decreases the microscopic activity along the upper surface and redistributes the activity along the entire column of the filter, changing more dissolved waste to the more easily removed solid waste. Thus, secondary water treatment becomes more efficient and effective.

Though the invention has been described with respect to a specific preferred embodiment thereof, many variations and modifications will become apparent to those skilled in the art. Such changes contemplated by this invention include the substitution of sheaves 58 and 86 and V-belt 62 with a chain and sprocket arrangement. Another contemplated variation may be the attitude in which wheel 40 engages static wall 14. Instead of engaging upper surface 42, wheel 40 may contact the ground or sidewall of vessel 12. It is therefore the intention that the appended claims be interpreted as broadly as possible in view of the prior art to include all such variations and modifications.

The embodiments of the invention in which an exclusive property or privilege is claimed are defined as follows:

1. An apparatus for controlling the rotation rate of a wastewater distribution assembly for a sewage treatment trickling filter contained by a vessel, the distribution assembly being of the type including a support and at least one distribution arm terminating adjacent the wall of said vessel, said apparatus comprising in combination:
   a carriage having at least one wheel mounted to an end of the distribution arm, said wheel engaging a wall of the vessel; and
   hydraulic feed back means responsive to the rotation of said wheel for controlling the free wheeling of said wheel about said vessel, thereby retarding motion of said distribution arm in response to increasing rotation rate of said wheel.

2. The apparatus as described in claim 1, wherein said hydraulic feedback means includes:
   a hydraulic pump;
   a fluid reservoir;
   high and low pressure means for interconnecting said pump to said fluid reservoir;
   adjustable orifice serially disposed within said high pressure means for controlling the amount of hydraulic fluid passed therethrough; and
   means for driving said pump by rotation of said wheel.

3. The apparatus as described in claim 2, wherein said adjustable orifice is a needle valve.

4. The apparatus as recited in claim 2, wherein said means for driving said pump by said wheel includes:
   a first sheave attached to a shaft of said pump;
   a second sheave attached to an axle of said wheel; and
   a belt loop interconnecting said first and second sheave.

5. An apparatus as recited in claim 4, wherein said first sheave has a diameter less than that of said second sheave.

6. An apparatus as recited in claim 2, wherein said hydraulic feedback means is disposed in a housing fixed to said carriage.

7. An apparatus as recited in claim 1, further including means, securing said frame to the end of said distribution arm, for absorbing spatial variations between the end of said distribution arm and the vessel.

8. An apparatus as recited in claim 7, wherein said means for absorbing spatial variations includes a bracket disposed at an end of an axle rotatably secured to said carriage.

9. An apparatus for controlling the rotation rate of a sewage distribution assembly having a centrally disposed head located above a filter media constrained by a vessel and having at least one radially oriented distribution arm extending therefrom, said apparatus comprising:
   a frame secured to an end of the distribution arm;
   a wheel rotatably mounted to said frame and engaging a static constraining surface adjacent the filter media;
   a hydraulic feedback circuit mounted to said frame and constructed and arranged to be responsive to rotation of said wheel for retarding the rotation rate of the sewage distribution assembly in response to increased rotation rate; and
   means for interconnecting said wheel with said hydraulic feedback circuit.

10. The apparatus as recited in claim 9, wherein said frame further includes means for securing said frame to the distribution arm for absorbing spatial variations between said vessel containing the filter media and the distribution arm.

11. The apparatus as recited in claim 10, wherein said means for absorbing spatial variations includes a bracket having a single horizontal axle extending therefrom substantially parallel with the distribution arm; and
    a sleeve fixed to said frame and receiving said axle so that said frame can pivot about and slide axially with respect to said axle.

12. An apparatus as recited in claim 9, wherein said wheel includes a shaft mounted to a first end of said frame by a pair of pillow blocks.

13. An apparatus as recited in claim 12, wherein said frame further includes a housing located above said frame and retains said hydraulic circuit.

14. An apparatus as recited in claim 13, wherein said hydraulic circuit includes:
    a pump fixed to a wall of said housing and having a shaft extending outside of said housing;
    means for coupling said pump shaft to said wheel;
    a source of hydraulic fluid mounted to another wall of said housing;
    high and low pressure means placing said pump in fluid communication with said source of hydraulic fluid; and
    metering means in series with said high pressure means, said metering means being adjustable so as to vary an amount of hydraulic fluid passing through said high pressure means.

15. An apparatus as recited in claim 14, wherein said means for coupling said pump shaft with said wheel includes:
    a first sheave mounted to an end of said shaft extending through said wheel;

a second sheave mounted to an end of said pump shaft and contained in a plane substantially the same as that of said first sheave; and a belt looping about both sheaves.

16. An apparatus as recited in claim 15, further comprising an idler arm mounted to said carriage for maintaining said belt taut about said sheaves.

17. An apparatus for controlling a distribution rate of wastewater from a distribution in a trickling filter vessel, the distributor having a head centrally disposed at one end of the vessel and having at least one arm extending radially therefrom, said apparatus comprising:

a frame mounted to an end of the arm;

a wheel rotatably mounted to said frame and engaging the vessel such that said wheel is in constant contact with the vessel;

a closed hydraulic feedback circuit having an adjustable restriction therein; and means interconnecting said wheel to said closed hydraulic feedback circuit whereby said hydraulic feedback circuit retards the rotation rate of said wheel in response to an increased rotation rate of said wheel, which in turn governs the rotation rate of the distributor.

18. An apparatus as recited in claim 17, wherein said hydraulic circuit further includes:

a hydraulic pump having a shaft extending therefrom;

a reservoir of hydraulic fluid;

a high and low pressure line placing said hydraulic pump in fluid communication with said reservoir; and an adjustable valve disposed in series with said high pressure line between said pump and said reservoir for varying an amount of hydraulic fluid to pass therethrough moved by said pump, said valve adjustable by an operator.

19. An apparatus as recited in claim 18, wherein said means interconnecting said wheel to said hydraulic circuit includes:

a shaft retaining said wheel on said frame;

a first sheave mounted to an end of said shaft retaining said wheel;

a second sheave mounted to a free end of said shaft extending from said pump, said second sheave substantially aligned with said first sheave;

a belt looped about said first and second sheave; and means mounted to said frame for adjusting the tightness of said belt about said first and second sheave.

* * * * *

UNITED STATES PATENT AND TRADEMARK OFFICE
CERTIFICATE OF CORRECTION

PATENT NO. : 5,190,644

DATED : March 2, 1993

INVENTOR(S) : Robert S. Wisniewski

It is certified that error appears in the above-identified patent and that said Letters Patent is hereby corrected as shown below:

Column 4, line 46:
   "medium 1" should be --medium 18--.
Column 5, line 30:
   "sheaves 58. 86" should be --sheaves 58, 86--.
Column 9, line 9, claim 17:
   "distribution" should be --distributor--.

Signed and Sealed this

Fifth Day of April, 1994

Attest:

BRUCE LEHMAN

Attesting Officer

Commissioner of Patents and Trademarks